United States Patent [19]

Sonnek

[11] Patent Number: 4,611,383
[45] Date of Patent: Sep. 16, 1986

[54] TOOL HOLDER FOR MACHINE TOOLS

[75] Inventor: Werner Sonnek, Lichtenwald, Fed. Rep. of Germany

[73] Assignee: Traub GmbH, Fed. Rep. of Germany

[21] Appl. No.: 617,369

[22] Filed: Jun. 5, 1984

[30] Foreign Application Priority Data

Jun. 8, 1983 [DE] Fed. Rep. of Germany ....... 3320693

[51] Int. Cl.⁴ ............................................ B23G 3/157
[52] U.S. Cl. ..................................... 29/568; 82/34 R; 409/234
[58] Field of Search .................. 29/568, 564; 409/232, 409/234, 233; 82/36 R, 36 A, 36 B; 279/1 TS

[56] References Cited

U.S. PATENT DOCUMENTS

| | | | |
|---|---|---|---|
| 3,136,217 | 6/1964 | Swanson et al. | 409/232 X |
| 3,311,023 | 3/1967 | Kaiser | 409/233 X |
| 3,344,511 | 10/1967 | Hosea | 29/568 |
| 3,491,624 | 1/1970 | Poincenot | 29/568 X |
| 3,646,664 | 3/1972 | Vearil et al. | 29/568 |
| 3,672,691 | 6/1972 | Hammond | 409/232 X |
| 3,953,039 | 4/1976 | Hauge et al. | 29/568 X |
| 4,384,397 | 5/1983 | Nelson | 29/568 |
| 4,457,193 | 7/1984 | Matthey | 29/564 |
| 4,516,311 | 5/1985 | Takakuwa et al. | 29/568 |

Primary Examiner—Gil Weidenfeld
Assistant Examiner—Glenn L. Webb
Attorney, Agent, or Firm—Lucas & Just

[57] ABSTRACT

The tool holder (14) includes a tool holder head (30) having a planar abutment face (38) and a tool holder shaft (40) extending at right angles away from the abutment face (38) and adapted to be clamped in a receiving bore (44) of a tool support (10). A gripper plate (50) lies in abutment against the abutment face (38) all around the tool holder shaft (40) and has two gripping faces (54 and 56) inclined with respect to each other at one side of the tool holder shaft (40) and another gripping face (58) at the opposite side inclined with respect to said two gripping faces. The gripper plate (50) is adapted to be grasped in such manner by a gripper (20) that the tool holder (14) will adopt an exactly predetermined position with respect to the gripper (20), regardless of how the tool holder is designed otherwise.

6 Claims, 7 Drawing Figures

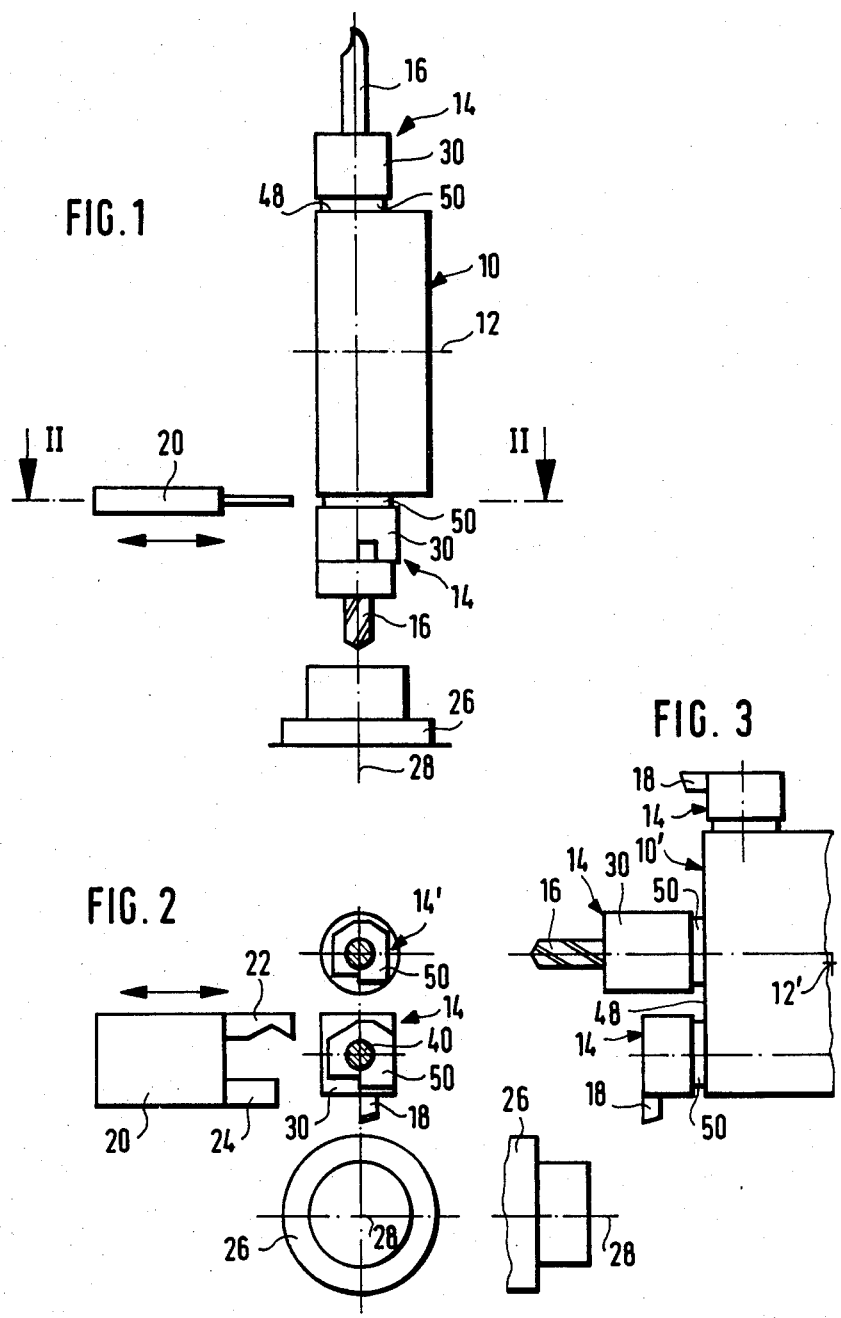

TOOL HOLDER FOR MACHINE TOOLS

The invention relates to a tool holder for machine tools having associated thereto gripper means which include at least one gripper for automatically exchanging tool holders, said tool holder comprising a tool holder head which includes fastening means for a tool at one side at least and a planar abutment face at another side of said tool holder, and a tool holder shaft extending at right angles away from the abutment face and adapted to be clamped in a receiving bore of a tool support.

Tool holders of this kind which are used above all for numerically controlled lathes are specified in the guidelines VDI-Richtlinie 3425 (VDI-Verlag GmbH, Düsseldorf, 1972). The tool holder head of such tool holders may be formed with engagement faces extending parallel to the tool holder shaft to be engaged by a gripper. Different tools, such as external machining tools in the form of cutters and internal machining tools in the form of drill bits or the like in general require tool holders which differ considerably in configuration and dimensioning of their retaining heads. In many cases it is impossible to provide such different heads with uniform engagement faces disposed at uniform spacings from the axis of the coordinated shank or tool holder shaft so the different tool holders might be grasped and exchanged automatically by means of changers of simple design. If indeed all tool holders destined for use in one machine tool can be provided with uniform engagement faces, these will be located at great distances from each other since they are disposed at the outside of the tool holder heads. Consequently, a gripper is required which has a correspondingly wide opening.

It is, therefore, an object of the invention to develop tool holders of the kind specified initially such that they can be grasped and transported safely and accurately by a gripper which is simple and not too big, even if the design of their tool holder heads differs very much.

Starting from the known tool holder described, this object is met, in accordance with the invention, in that a gripper plate is arranged adjacent the abutment face so as to surround the tool holder shaft, said gripper plate having at least one gripping face each at opposed sides of the tool holder shaft.

By virtue of the invention the design and arrangement of the gripping faces, including their mutual spacing becomes independent of the outer configuration of the coordinated retaining head. Thus any desired number of tool holders whose tool holder heads may differ considerably in their external shapes can be furnished with gripping faces which are exactly alike and not too far apart so that, consequently, they can be grasped by a gripper of but moderate size.

The gripper plate may be made integral with the tool holder head and/or the tool holder shaft. With a preferred embodiment of the invention, however, the gripper plate is a separate structural member which is blocked onto the tool holder shaft and fixed to the tool holder head lying flat against the abutment face. Such gripper plates can be produced at low costs and also are adapted to be secured subsequently to existing tool holders in use.

Preferably, the gripper plate is so designed that it can be fixed in at least two different angular positions at the tool holder head. This makes it possible to equip tool holders arranged in different fashion at a tool support with a gripper plate each in such manner that a gripper always has to carry out substantially the same movements in space in order to grasp and release these different tool holders. The gripper plates according to the invention thus contribute to simplifying the design and control of the means for automatic exchange of the tool holders.

The latter feature can be realized especially easily by providing the gripper plate with four fixing holes which are mutually offset by 90° around the tool holder shaft.

It is also advantageous if the gripper plate has first and second gripping faces at one side of the tool holder shaft which are inclined with respect to each other and a third gripping face at the opposite side of the tool holder shaft, said third gripping face being inclined with respect to the first and second gripping faces. This makes it possible to use a gripper adapted to this configuration of the gripping faces to grasp the gripper plate according to the invention in such manner that the geometric axis of the associated tool holder shaft has a strictly defined position in space at any position of the gripper.

Moreover, it is advantageous if the gripping faces together with the abutment face of the tool holder head form a V-shaped groove each. In this why the relative positions of the tool holder and of the gripper grasping the same are exactly defined also in axial direction of the tool holder shaft.

Tool holders of the kind specified initially may be provided with a toothing on their tool holder shaft, and a locking bar having a complementary toothing and being displaceable transversely of the tool holder shaft in the tool support may be associated with the same for clamping the tool holder. With this known design of the tool holder the thickness of the gripper plate in accordance with the invention is the same as the pitch of the toothing or an integral multiple thereof. In this manner the tool holder may be used selectively with or without a gripper plate according to the invention or, in other words, a tool support specifically designed for cooperation with the known tool holders as recited in the preamble, may be used for clamping tool holders including a gripper plate according to the invention, without any change of the locking bar and its arrangement within the tool support.

The invention will be described further, by way of example, with reference to the accompanying drawings, in which:

FIG. 1 is a top plan view of parts of an automatic turning lathe, including tool holders according to the invention;

FIG. 2 is a vertical sectional view along line II—II in FIG. 1;

FIG. 3 is a top plan view of parts of another automatic turning lathe, including tool holders according to the invention;

Figure 4:
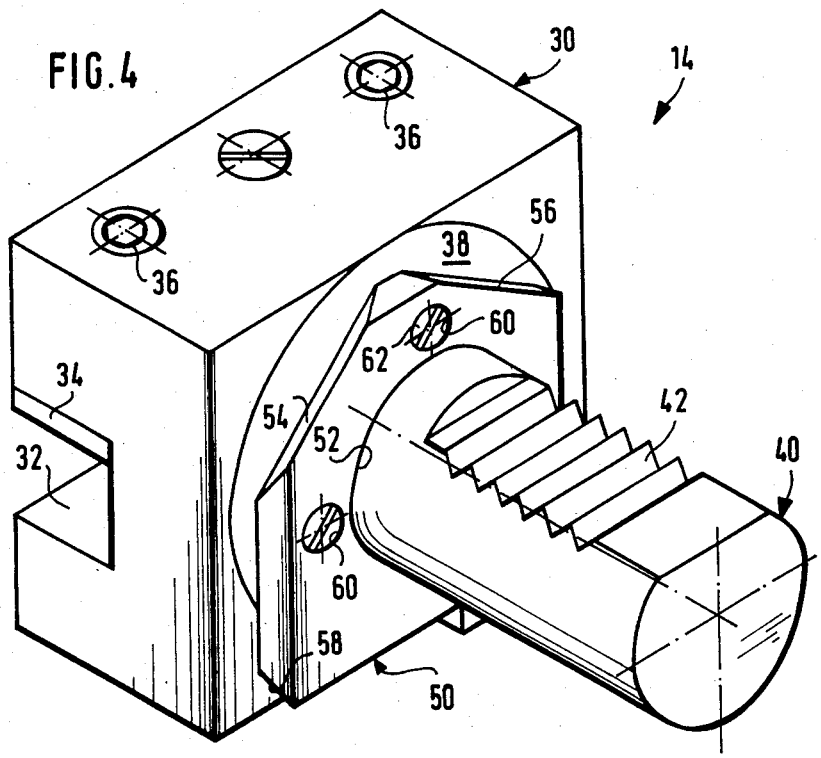
FIG. 4 is an enlarged oblique view of one of the tool holders shown in FIG. 3.
Figure 5:
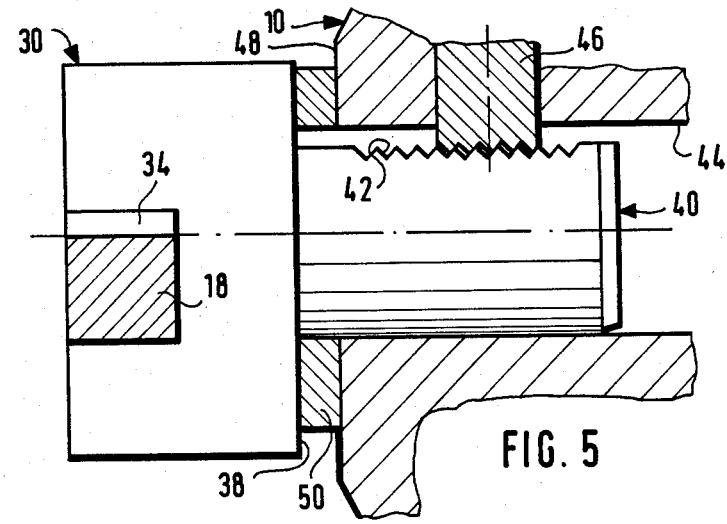
FIG. 5 is a side elevation, partly in longitudinal section, of the tool holder shown in FIG. 4, in assembled condition.
Figure 6:
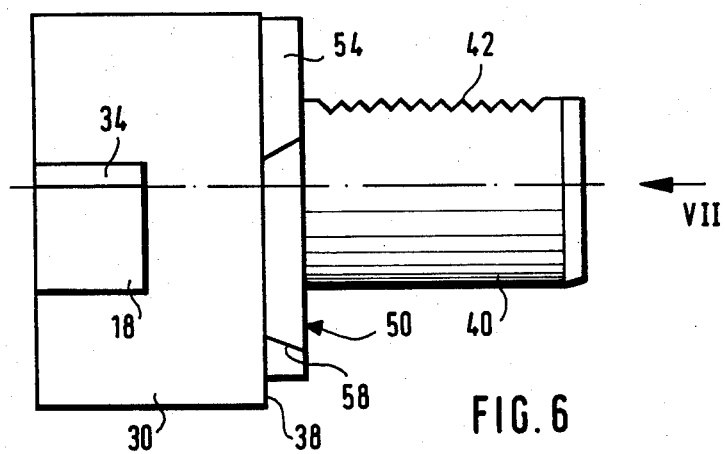
FIG. 6 is the corresponding side elevation of the tool holder alone.

FIG. 1 shows a tool support 10 designed as a star turret of an automatic turning lathe and being rotatable about a horizontal axis 12. A plurality of tool holders 14 furnished with tools are fixed at uniform angular spacings along the periphery of the tool support 10. The fig. shows two internal machining tools 16, namely a drill rod and a twist drill both extending radially with respect to the axis 12. Further tool holders 14 of which one is shown in FIG. 2 and which are mounted on the tool support 10 may be equipped with external machining tools 18, such as turning bits. The tool holders 14 are adapted to the type of tool 16 or 18 they are to carry and consequently they are of different external shapes and dimensions. For instance, FIG. 2 shows a tool holder 14' of circular outline above tool holder 14 which is substantially of square outline. FIG. 3 shows a tool support 10' which is a variant of the tool support 10 presented in FIG. 1 and designed as a square flat bed turret which is rotable about a vertical axis 12'. The four sides of the tool support 10' each are occupied by one or two tool holders 14 of which each one carries an internal machining tool 16 or an external machining tool 18.

At least one gripper 20 is coordinated with the tool support 10 according to FIGS. 1 or 2 for exchange of the tool holders 14, including their associated tools 16 and 18. The gripper 20 comprises two fingers 22 and 24 movable with respect to each other, namely one finger 22 having an inner edge which is bent at an angle and one finger 24 which has a straight inner edge. A corresponding gripper is coordinated also with the tool support 10' according to FIG. 3, but it is not shown in the drawing. As may be taken from FIGS. 1 and 2, the gripper 20 is adapted to be engaged with each respective tool holder 14 being in an operative position opposite a chuck 26 which is rotatable about a main spindle axis 28. Alternatively, the gripper 20 may be employed to exchange the respective tool holder 14 located for instance in a 90° offset position with respect to the chuck 26.

Each tool holder 14 has a tool holder head 30 including fastening means for a tool 16 or 18. As shown in FIGS. 4 to 7, the fastening means consist of a fastening groove 32, a clamping plate 34, and a pair of clamping screws 36 for clamping an external machining tool 18 embodied by a turning bit. A planar abutment face 38 is formed at the backside of the tool holder head 30, remote from the fastening groove 32.

A substantially cylindrical tool holder shaft 40 extends at right angles from the tool holder head 30 approximately in the middle of the abutment face 38. At its upper side, as seen in FIGS. 4 to 7, this shank or tool holder shaft is flattened and provided with a toothing 42. The tool holder shaft 40 fits into a receiving bore 44 of the tool support 10. A locking bar 46 is guided for displacement transversely of the receiving bore 44 in the tool support 10. The inner front end face of the locking bar 46 with respect to the receiving bore 44 is provided with teeth which are complementary to the toothing 42. A clamping device of conventional type (not shown) may be used to exert a radial force on the locking bar 46 with respect to the receiving bore 44, this force being converted by the toothing 42 into an axial force which pulls the tool holder shaft 40 into the receiving bore 44.

Tool holders 14 characterized by the features thus far described are known. In operation they are held by the locking bar 46 in a clamping position in which the abutment face 38 abuts against a plane surface 48 disposed vertically with respect to the axis of the tool holder shaft 40. As follows from FIGS. 1 to 7, however, a gripper plate 50 is disposed between the abutment face 38 and the plane surface 48. This gripper plate will be described in greater detail below.

The gripper plate 50 is a rather thin plate of hard steel. In the example shown, its thickness d is twice as great as the pitch t of the toothing 42. The toothing 42 extends sufficiently far across the length of the tool holder shaft 40 for the gripper plate 50 disposed between the abutment face 38 and the plane surface 48 not to be able to prevent the locking bar 46 from cooperating with the toothing 42 in appropriate manner just like in a tool holder without a gripper plate 50.

Figure 7:
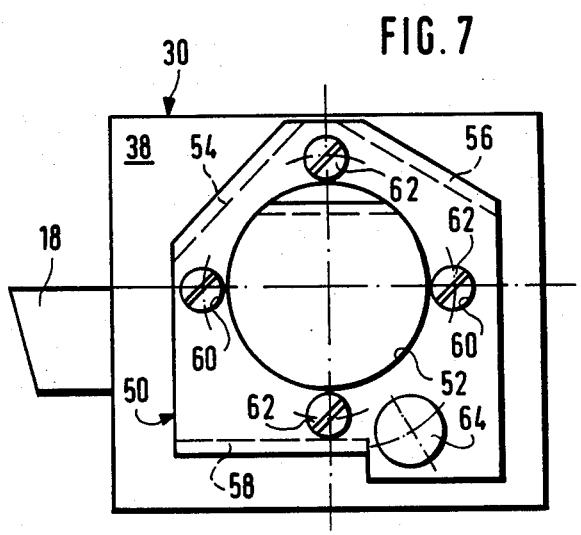
FIG. 7 is a view as seen in the direction of arrow VII in FIG. 6.

The gripper plate 50 has a central bore 52 and is blocked tightly fitting on the tool holder shaft 40 so as to be centered accurately with respect to the tool holder shaft and the entire tool holder 14. Two gripping faces 54 and 56 for the finger 22 having the inner edge bent at an angle of the gripper 20 are formed at the upper side of the gripper plate 50, as seen in FIGS. 4 to 7. Gripping face 54 is inclined at an angle of 45° with respect to the horizontal central axis of the tool holder 14, as seen in FIG. 7, in correspondence with the bending of the inner edge of finger 22. Gripping face 56, on the other hand, is inclined at an angle of 30° in the opposite direction. A third gripping face 58 is formed at the lower side of the gripper plate 50, as seen in FIGS. 4 to 7, said third gripping face extending in parallel with the horizontal central axis of the tool holder 14, as seen in FIG. 7. The third gripping face 58 is associated with the straight inner edge finger 24 of the gripper 20.

The gripper plate 50 has four fixing holes 60 formed mutually offset at angular spacings of 90° each around the central bore 52 as through bores which each receive a countersunk screw 62. The tool holder head 30 is provided with correspondingly arranged threaded bores, not shown in the drawings, into which the countersunk screws 62 are threaded. In this manner the gripper plate 50 is secured to the tool holder 14 exactly centrally and rigidly. Yet upon loosening of the countersunk screws 62 it may be turned by an angle of 90° or a multiple thereof and then fixed again if this is more convenient in consideration of the cooperation with the gripper 20.

Each gripping face 54, 56, and 58 is so inclined with respect to the longitudinal axis of the tool holder shaft 40 that it forms a kind of groove of V-shaped cross section together with the abutment face 38.

In accordance with FIG. 7 the gripper plate 50 has an eccentrically placed bore 64 which cooperates in conventional manner with a centering pin not shown but fixed to the tool holder. The centering pin is hollow and communicates with a coolant conduit connected by way of bore 64 with coolant passages in the tool holder head 30.

What is claimed is:

1. A tool holder adapted to be attached to a turret of a machine tool having associated thereto gripper means which include at least one gripper for automatically exchanging tool holders, said tool holder comprising:
   a tool holder head which includes fastening means for a tool at one side and a planar abutment face at another side of said tool holder head, and
   a substantially cylindrical tool holder shaft extending at right angles away from the abutment face and adapted to be clamped in a receiving bore of said turret, wherein a gripper plate is arranged adjacent the abutment face so as to surround said substantially cylindrical tool holder shaft, said gripper plate having a first and a second gripping face inclined with respect to each other, and at the opposite side of the tool holder shaft the gripper plate comprising a third gripping face inclined with respect to the first and second gripping faces.

2. The tool holder as claimed in claim 1, wherein the gripper plate is designed as a separate structural member, blocked onto the tool holder shaft, and fixed to the tool holder head lying in abutment against the abutment face.

3. The tool holder as claimed in claim 2, wherein the gripper plate is adapted to be fixed in at least two different angular positions at the tool holder head.

4. The tool holder as claimed in claim 3, wherein the gripper plate has four fixing holes disposed mutually offset by 90° around the tool holder shaft.

5. The tool holder as claimed in claim 1, wherein the gripping faces together with the abutment face of the tool holder head each form a V-shaped groove.

6. The tool holder as claimed in claim 1, the tool holder shaft of which is provided with a toothing with which a locking bar is associated having a complementary toothing, being slidable transversely of the tool holder shaft in the tool support, and being adapted to clamp the tool holder, wherein the thickness (d) of the gripper plate corresponds to the pitch (t) of the toothing or an integral multiple thereof.

* * * * *